March 11, 1969   W. J. KUDLATY   3,431,883
PRESSURE DIFFERENTIAL INDICATOR FOR FILTERS
Filed Feb. 19, 1965
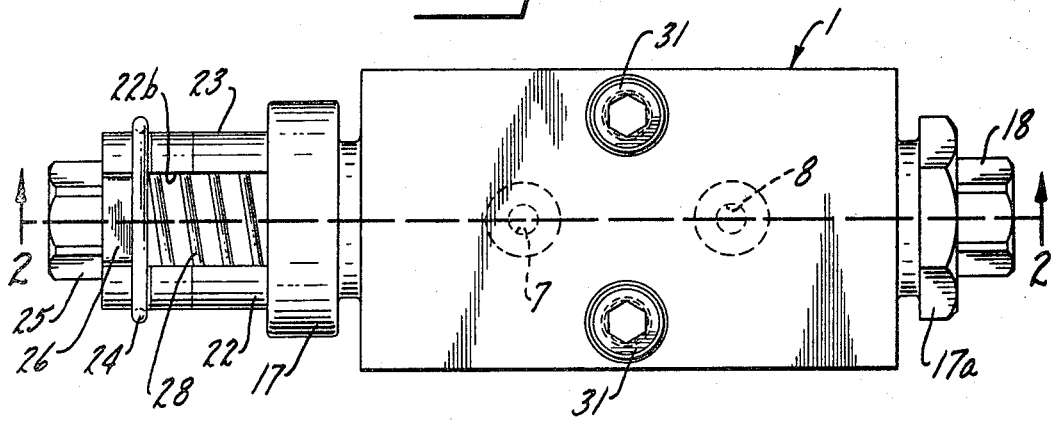
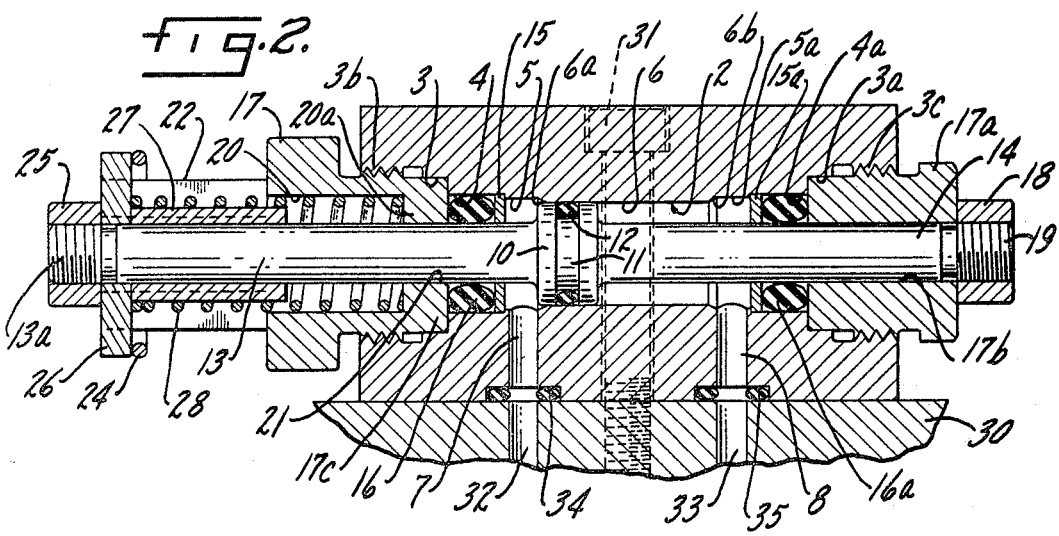
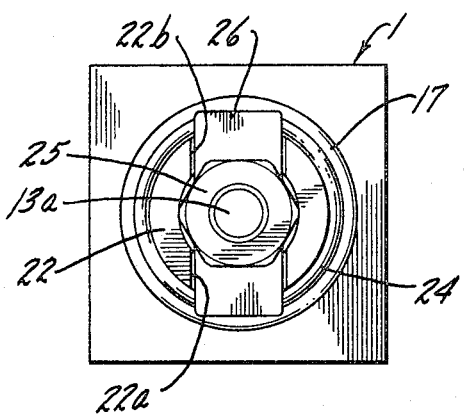
INVENTOR.
Walter J. Kudlaty,
BY Parker & Carter
Attorneys.

United States Patent Office 3,431,883
Patented Mar. 11, 1969

3,431,883
PRESSURE DIFFERENTIAL INDICATOR
FOR FILTERS
Walter J. Kudlaty, Elmhurst, Ill., assignor to Marvel Engineering Company, Chicago, Ill., a corporation of Illinois
Filed Feb. 19, 1965, Ser. No. 433,874
U.S. Cl. 116—70                     2 Claims
Int. Cl. G01l 19/12; B01d 35/00

ABSTRACT OF THE DISCLOSURE

A contamination indicator for fluid filters in which fluid pressure on one side of the filter is continuously supplied to one side of a piston and fluid pressure on the other side of the filter is continuously supplied to the other side of said piston, the piston moving in automatic response to differentials in said pressures and carrying oppositely directed shafts extending outwardly of the piston housing to actuate an indicator, the shafts extending through plugs inserted in identical bores and retaining identical seals in the opposite ends of the piston chamber.

---

This invention relates to indicators, and has particular relation to pressure differential indicators.

One purpose of the invention is to provide a pressure differential indicator for use with filter systems.

Another purpose is to provide a pressure differential indicator which may be employed with systems utilizing filters of varying types.

Another purpose is to provide a pressure differential indicator which may be located at any suitable point in a fluid pressure system.

Another purpose is to provide a fluid pressure differential indicator for use in fluid pressure systems.

Another purpose is to provide an assembly effective to sense and indicate the pressure differential at spaced points in a fluid pressure system.

Another purpose is to provide an assembly effective to sense and indicate a fluid pressure differential on opposite sides of a fluid filter.

Another purpose is to provide an assembly including alternatively locatable indicator elements.

Another purpose is to provide an assembly effective to display minute pressure differentials.

Another purpose is to provide a pressure differential sensing and indicating device which includes a minimum of parts and which may be easily and quickly assembled and disassembled.

Other purposes will appear from time to time during the course of the specification and claims.

The invention is illustrated more or less diagrammatically in the accompanying drawings, wherein:

FIGURE 1 is a top plan view;
FIGURE 2 is a cross-sectional view taken on the line 2—2 of FIGURE 1; and
FIGURE 3 is an end view.

Like parts are indicated by like numerals throughout the specification and drawings.

Referring now to the drawings, FIGURE 1 generally designates a housing. Extending through the housing is a bore 2 which may be conveniently positioned axially through the housing as shown. The bore 2 has enlarged opposite end portions 3, 3a, parts of which may be inwardly threaded as indicated at 3b, 3c. The end portions 3, 3a communicate, respectively, with reduced portions 4, 4a. The portions 4, 4a in turn communicate with further reduced portions, respectively, 5, 5a. The portions 5, 5a in turn communicate, respectively, with the opposite ends of the central portion 6, the inner wall surface of bore 2 being conically inclined at the opposite ends of the portion 6 as indicated at 6a, 6b.

A first passage 7 is formed in housing 1 and communicates the bore portion 5 with the area outside the housing. A second passage 8 is formed in housing 1 in spaced relation with passage 7 and communicates the bore portion 5a with the area outside housing 1.

Slidable in bore portion 6 is a piston 10. The piston 10 has an annular recess 11 centrally positioned in its circumferential wall for reception of piston seal 12 arranged for engagement with the inner wall surface of bore 6. Piston 10 has a first shaft portion 13 extending axially from one surface of piston 10 to a point outwardly of one side of housing 1. A second shaft portion 14 extends axially from the opposite surface of piston 10 to a point externally of the opposite side of housing 1.

Retainers 15, 15a are seated on the shoulder formed between bore portions 4 and 5 and 4a and 5a, respectively. Shaft seals 16, 16a are retained against retainers 15, 15a by plugs 17, 17a, said plugs being positioned within bore portions 3, 3a, respectively, and being threadably held therein by engagement with the threaded portions 3b, 3c, respectively. The shaft seals 16, 16a engage the external surface of piston rod portions 13, 14, respectively. Shaft portion 14 extends through bore 17b in plug 17a and a stop element or abutment 18 is secured, as by the threads 19, to the end of shaft portion 14.

Plug 17 is formed with a central well or chamber 20. The shaft 13 extends through an opening 21 in the end wall 17c of plug 17 and through the chamber 20. A hollow sleeve extension 22 of plug 17 surrounds and defines the outer end portion of chamber 20. The external circumferential surface 23 of sleeve 22 carries suitable indicia which may take the form of various colors. Surrounding and slidable along said surface 23 is an indicator ring 24. The outer end portion of shaft 13 is threaded as at 13a and carries a retainer member 25, which in turn abuts a finger member 26 carried by shaft 13. Opposite end portions, as may be best seen in FIGURE 3, of member 26 extend through and are movable within slots 22a, 22b of sleeve 22 to engage the surface of ring 24 beyond plug 17 when finger member 26 is moved toward housing 1. A stop tube 27 surrounds shaft portion 13 and is movable with member 26, the inner end of tube 27 being positioned to abut the bottom wall 20a of chamber 20 when the shaft 13 and member 26 have moved their maximum desired distance toward housing 1 or to the right as the parts are shown in the drawings. A yielding means, such as spring 28, is positioned in chamber 20 and engages member 26 to urge member 26, shaft portion 13 and piston 10 toward an outermost position, or to the left as the parts are shown in the drawings, in response to a pressure variation in which the force of pressure in passage 7 is less than the combined forces of spring 28 and the pressure in passage 8.

The housing 1 with the described elements may be secured to a suitable device, such as that shown in part at 30, by any suitable means such as the fasteners 31, the passages 7, 8 being aligned with communicating passages 32, 33, respectively, in the device 30 and seals 34, 35 may be provided for sealing the housing 1 to the device 30 about the point of communication between passages 7 and 32 and passages 8 and 33, respectively.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. For example, the housing 1 is illustrated as secured to a device 30, though it will be understood that the passages 7, 8 could be suitably connected through appropriate conduits to appropriate portions of a fluid pressure system without departing from the nature and scope of the invention.

The use and operation of the invention are as follows:

The invention is effective to sense and react to pressure differentials in a fluid pressure system. A passage 7 is suitably communicated with the fluid pressure system at an upstream portion thereof, for example. The passage 7 delivers fluid to the chamber at 5 on one side of piston 10. The passage 8 delivers fluid pressure from another or downstream part of the fluid pressure system to the chamber at 5a on the opposite side of piston 10. Suitable points of connection of passages 7 and 8 with a fluid pressure system, for example, would be on opposite sides of a filter in the fluid pressure line of such system. When such a filter is clean or above a predetermined level of contamination or clogging the pressure differential across such filter will be such as to permit spring 28 to maintain the parts in the position shown in FIGURE 2. As the level of contamination in such filter approaches said predetermined level, the upstream pressure in passage 7 communicating with the system above the filter will be greater than the downstream pressure in passage 8 communicating with the system below the filter. When that pressure differential is such as to overcome the action of spring 28, piston 10 is moved away from plug 17, or to the right as the parts are shown in the drawings, and indicator ring 24, through the mediacy of finger element 26, is moved along the indicator surface 23.

It will be observed that plugs 17, 17a are interchangeable in housing 1 so that the indicator structure may be positioned on either side thereof and passages 7 and 8 connected accordingly. In either event, movement of the indicator ring 24 along surface 23 is produced in response to predetermined variance pressures delivered through passages 7 and 8.

It will be understood that the operator observes the position of indicator ring 24 on surface 23 and upon finding said ring in position to indicate the movement of piston 10, the operator will act to clean or replace the offending filter. It will be understood that rod end 19 or nut 18 may be suitably secured to or associated with an appropriate signaling device, such as a light or audible signal. The nut 18 may engage electrical contacts, for example, to actuate an electrical warning system or a shutdown circuit, for example, in response to movement of member 10, 13, 14.

Thus a simplified, compact pressure differential sensing and indicating device of maximum economy and reliability is provided. A particularly advantageous use of the invention is in connection with filters in a fluid pressure system, providing a direct indication of filter clogging at locations selectively close to or remote from the filter.

There is claimed:

1. For use in a fluid power system having a filter, an upstream portion on one side of said filter and a downstream portion on the other side of said filter, a housing, a central chamber in said housing, a piston reciprocal in said chamber and in sealing engagement with the internal wall surface of said chamber, a first passage communicating said chamber on one side of said piston with said upstream portion, a second passage communicating said chamber on the opposite side of said piston with said downstream portion, oppositely extending shafts on and movable with said piston, said shafts extending in opposite directions outwardly of said housing and in sliding, sealed engagement therewith, said piston being movable within said chamber in response to pressure variations delivered to said chamber through said passages, plugs closing the opposite ends of said chamber, at least one of said shafts extending through at least one of said plugs, said piston being yieldingly urged in one direction and being urged in the opposite direction by an excess of pressure in said first passage and said upstream portion, said indicator structure comprising a sleeve extending axially from said one plug, indicia positioned on the external surface of said sleeve, a ring surrounding and slidably engaging said external sleeve surface, said sleeve having a longitudinal slot therein, a finger member carried at the distal end of the shaft extending through said one plug, a stop tube slidable on said last-named shaft between said finger member and said plug and positioned to limit movement of said finger member toward said plug, said finger member extending radially through said slot beyond said ring from said plug, said finger member being positioned for engagement with said ring, whereby movement of said piston in said opposite direction moves said finger member and said ring along said indicia surface toward said plug.

2. The structure of claim 1 wherein said housing includes a relatively flat external surface penetrated by said first and second passages, said surface being countersunk in axial alignment with each of said passages for reception of passage seal means, and at least one bore extending through said housing in parallel relationship with said passages for extension therethrough of housing fastener means.

References Cited
UNITED STATES PATENTS

| | | | |
|---|---|---|---|
| 2,574,866 | 11/1951 | Fahrlander | 73—210 |
| 2,803,718 | 8/1957 | Bloom et al. | |
| 1,187,693 | 6/1916 | Woolley | 116—70 |
| 2,916,205 | 12/1959 | Litz | 73—419 XR |
| 3,145,570 | 8/1964 | Grandstaff | 73—419 |
| 3,182,630 | 5/1965 | Claeys | 116—70 |
| 3,203,246 | 8/1965 | Horwitt et al. | 73—419 |
| 3,325,010 | 6/1967 | Sackett | 210—90 |

LOUIS J. CAPOZI, *Primary Examiner.*

U.S. Cl. X.R.

210—90